3,402,201
N-CYCLOOCTYL-ALKYL-ANILINES
Louis Schmerling, Riverside, Ill., assignor to Universal Oil Products Company, Des Plaines, Ill., a corporation of Delaware
No Drawing. Filed Mar. 4, 1963, Ser. No. 262,380
7 Claims. (Cl. 260—576)

This invention relates to the stabilization of organic substances by incorporating therein a novel additive, and to the additive as a novel composition of matter.

A compound of the formula

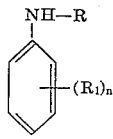

wherein R is cyclooctyl, $R_1$ is alkyl having from 1 to about 6 carbon atoms and $n$ is an integer of 2 or 3.

Many organic substances undergo undesired deterioration in storage, during transportation and/or in use due to oxidative reactions and/or due to the effect of ozone. Illustrative organic substances which undergo undesirable deterioration and which may be stabilized in accordance with the present invention include saturated gasoline such as straight run gasoline, natural gasoline, hydro-reformed gasoline, etc., or unsaturated gasoline such as thermally cracked gasoline, catalytically cracked gasoline, coker gasoline, polymer gasoline, etc., or mixtures of saturated and/or unsaturated gasolines, naphtha, kerosene, jet fuel, gas oil, diesel oil, fuel oil, residual oil, lubricating oil, which may be of petroleum or synthetic origin, grease, rubber, which may be natural or synthetic, adhesives, resins, plastics including polyethylene, polypropylene and/or polybutylene, as well as edible mineral oils and edible and non-edible animal and vegetable fats and oils including lard, beef tallow, soy bean oil, linseed oil, castor oil, menhaden oil, etc., which may be partially or totally hydrogenated or otherwise treated, and solid food products containing the fat or oil.

In one embodiment the present invention is particularly applicable to the stabilization of rubber which, as hereinbefore set forth, may be natural or synthetic. Such rubber undergoes undesirable cracking due to ozone and also undesirable flex cracking, sun cracking and other deterioration due to oxygen. Such deterioration may be retarded and/or prevented by means of the novel additive of the present invention. Natural and synthetic rubber may be described generally as a rubbery polymer of a conjugated 1,3-diene, either as polymers or as copolymers thereof with other polymerizable compounds. Natural rubber includes Hevea rubber, caoutchouc, balata, gutta-percha, etc. Much of the synthetic rubber now being produced commercially is known in the art as SBR rubber and is a copolymer of styrene and butadiene. Other synthetic rubbers include butyl rubber, Buna-N rubber, neoprene rubber, silicone rubber, Thiokol rubber, etc.

The present invention also is particularly applicable to the stabilization of gasoline in order to retard and/or prevent gum formation, discoloration and other deterioration of the gasoline.

The novel additive of the present invention is an N-cyclooctyl aromatic amine. A particularly preferred additive is N,N'-dicyclooctyl-p-phenylenediamine which is very effective in preventing deterioration of organic substances and particularly of rubber. This additive is a solid at room temperature and accordingly offers numerous advantages in handling, transporting and using. For example, in the compounding of rubber, manufacturers prefer to work with solid ingredients. Because the compounder primarily handles solid ingredients, his available equipment is particularly suited for the weighing, handling and compounding of the solid ingredients. Accordingly, many compounders find advantages in working with solid additives.

Another advantage of the additive of the present invention relates to its use in gasoline. At the present time a particularly effective and extensively used anti-oxidant in gasoline is N,N'-di-sec-butyl-p-phenylenediamine. This antioxidant is marketed as a liquid and also is classified as toxic and accordingly must be handled with care. In contrast, N,N'-dicyclooctyl-p-phenylenediamine is a solid and is considerably less toxic. Accordingly, there is less hazard to the personnel working with this additive.

In one embodiment the present invention relates to a method of stabilizing an organic substance normally subject to deterioration which comprises incorporating in said organic substance a stabilizing concentration of an N-cyclooctyl aromatic amine.

In a specific embodiment the present invention relates to a method of stabilizing rubber normally subject to cracking due to ozone, which comprises incorporating in said rubber from about 1% to about 5% by weight of N,N'-dicyclooctyl-p-phenylenediamine.

In another specific embodiment the present invention relates to a method of stabilizing gasoline normally subject to oxidative deterioration which comprises incorporating in said gasoline from 0.0001% to about 1% by weight of N-cyclooctylaniline.

In still another embodiment the present invention relates to an organic substance normally subject to deterioration containing a stabilizing concentration of an inhibitor as herein set forth.

In still another embodiment the present invention relates to the N-cyclooctyl aromatic amine as a new composition of matter.

As hereinbefore set forth, the novel additive of the present invention is an N-cyclooctyl aromatic amine. Illustrative examples of N-cyclooctyl aromatic monoamines include N-cyclooctylaniline,
N-cyclooctyl-o-toluidine,
N-cyclooctyl-m-toluidine,
N-cyclooctyl-p-toluidine,
N-cyclooctyl-2,4-dimethylaniline,
N-cyclooctyl-2,5-dimethylaniline,
N-cyclooctyl-2,6-dimethylaniline,
N-cyclooctyl-2,4,6-trimethylaniline,
N-cyclooctyl-o-ethylaniline,
N-cyclooctyl-m-ethylaniline,
N-cyclooctyl-p-ethylaniline,
N-cyclooctyl-2,4-diethylaniline,
N-cyclooctyl-2,5-diethylaniline,
N-cyclooctyl-2,6-diethylaniline,
N-cyclooctyl-2,4,6-triethylaniline, etc.,
N-cyclooctyl-2-methyl-4-t-butylaniline,
N-cyclooctyl-2-ethyl-4-t-butylaniline,
N-cyclooctyl-2-isopropyl-4-t-butylaniline,
N-cyclooctyl-2-methyl-4-t-pentylaniline,
N - cyclooctyl - 2-methyl-4-t-hexylaniline [for example, N-cyclooctyl-2-methyl-4-(1,1-dimethylbutyl or 1-methyl-1-ethylpropyl or 1,1,2-trimethylpropyl)aniline],
N-cyclooctyl-2,6-dimethyl-4-t-butylaniline,
N-cyclooctyl-2,6-diethyl-4-t-butylaniline,
N-cyclooctyl-2,6-dipropyl-4-t-butylaniline,
N-cyclooctyl-2,6-dimethyl-4-t-pentylaniline,
N-cyclooctyl-2,6-dimethyl-4-t-hexylamine,
N-cyclooctyl-2,6-diisopropyl-4-methylaniline,
N-cyclooctyl-2,6-di-sec-butyl-4-methylaniline,
N-cyclooctyl-2,6-sec-pentyl-4-methylaniline,
N-cyclooctyl-2,6-di-sec-hexyl-4-methylamine, N-cyclooctyl-2,6-diisopropyl-4-ethylaniline,
N-cyclooctyl-2,6-di-sec-butyl-4-ethylaniline,
N-cyclooctyl-2,6-di-sec-pentyl-4-ethylaniline,
N-cyclooctyl-2,6-di-sec-hexyl-4-ethylaniline, etc.,
N-cyclooctyl-1-naphthylamine,
N-cyclooctyl-2-naphthylamine,
N-cyclooctyl-1-methyl-2-naphthylamine,
N-cyclooctyl-3-methyl-2-naphthylamine,
N-cyclooctyl-2-methyl-1-naphthylamine,
N-cyclooctyl-3-methyl-1-naphthylamine,
N-cyclooctyl-4-methyl-1-naphthylamine,
N-cyclooctyl-2-ethyl-1-naphthylamine,
N-cyclooctyl-1-ethyl-2-naphthylamine, etc.

It is understood that these specific aromatic amines are set forth for illustrative but not limiting purposes and that any suitable aromatic monoamine may be used in accordance with the present invention.

Of the aromatic diamines, the phenylenediamines are preferred. Particularly preferred is N,N'-dicyclooctyl-p-phenylenediamine. When desired, one or more alkyl groups may be positioned on the nucleus, the alkyl groups preferably being selected from methyl, ethyl, propyl, butyl, pentyl, hexyl, etc. While the N,N'-dicyclooctyl-p-phenylenediamine derivatives are preferred, the present invention also contemplates the use of the correspondingly substituted o-phenylenediamines and m-phenylenediamines. N-cyclooctylphenylenediamines include N-cyclooctyl-p-phenylenediamine, N-cyclooctyl-o-phenylenediamine, N-cyclooctyl-m-phenylenediamine, as well as those containing one or more alkyl substituents on the nucleus, the alkyl substituents preferably being selected from those hereinbefore specifically set forth.

In another embodiment, the present invention includes N-cyclooctylnaphthylenediamine and N,N'-dicyclooctylnaphthylenediamine. In still another embodiment the present invention comprises N-cyclooctylaminodiphenylalkanes and more particularly methanes, ethanes, propanes, butanes, pentanes, hexanes, etc., aminodiphenylamines, aminodiphenyl ethers and aminodiphenyl sulfides, as well as N,N'-dicyclooctyldiaminodiphenylalkanes, again particularly methanes, ethanes, propanes, butanes, pentanes, hexanes, etc., diaminodiphenylamines, diaminodiphenyl ethers, diaminodiphenyl sulfides, etc. In the diamines, it generally is preferred that they are in the positions of 4,4'- and 2,4'-, although these may be in different positions when desired. Here again, it is understood that one or both of the rings may be substituted on the nucleus with alkyl groups. Illustrative examples of additives in the last-mentioned embodiment include 4,4'-bis(cyclooctylamino)diphenylmethane,
2,4'-bis(cyclooctylamino)diphenylmethane,
4,4'-bis(cyclooctylamino)diphenylethane,
2,4'-bis(cyclooctylamino)diphenylethane,
4,4'-bis(cyclooctylamino)diphenylpropane,
2,4'-bis(cyclooctylamino)diphenylpropane,
4,4'-bis(cyclooctylamino)diphenylbutane,
2,4'-bis(cyclooctylamino)diphenylbutane, etc.,
4,4'-bis(cyclooctylamino)diphenylamine,
2,4'-bis(cyclooctylamino)diphenylamine,
4,4'-bis(cyclooctylamino)diphenyl ether,
2,4'-bis(cyclooctylamino)diphenyl ether,
4,4'-bis(cyclooctylamino)diphenyl sulfide,
2,4'-bis(cyclooctylamino)diphenyl sulfide, etc.

From the above discussion, it is seen that the present invention contemplates different novel compounds. It is understood that these different compounds are not necessarily equivalent in their activity as additives in the same or different substrates, but all of them will possess stabilizing activity in certain substrates.

The N-cyclooctyl aromatic amine, including the N,N'-dicyclooctyl aromatic diamine, is prepared in any suitable manner. In a preferred method, it is prepared by the reductive alkylation of the aromatic amine, aromatic nitro compound, aromatic diamine, aromatic dinitro compound or aromatic aminonitro compound. In one embodiment the aromatic amine or nitro compound is aniline, nitrobenzene, naphthylamine, nitronaphthalene, aminodiphenylalkane, nitrodiphenylalkane, aminodiphenylamine, nitrodiphenylamine, aminodiphenyl ether, nitrodiphenyl ether, aminodiphenyl sulfide, nitrodiphenyl sulfide, etc. Illustrative reactants to prepare the N-cyclooctyl or N,N'-dicyclooctyl aromatic diamines includes phenylenediamine, dinitrobenzene, aminonitrobenzene, naphthylenediamine, dinitronaphthylene, aminonitronaphthylene, diaminodiphenylalkane, dinitrodiphenylalkane, aminonitrodiphenylalkane, diaminodiphenylamine, dinitrodiphenylamine, aminonitrodiphenylamine, diaminodiphenyl ether, dinitrodiphenyl ether, aminonitrodiphenyl ether, diaminodiphenyl sulfide, dinitrodiphenyl sulfide, aminonitrodiphenyl sulfide, etc.

The reductive alkylation of the amino and/or nitro compound set forth above is effected by reacting the same with cyclooctanone in the presence of hydrogen and a suitable catalyst. A suitable catalyst for effecting the reaction comprises a mixture of the oxides of chromium, cobalt and barium although other suitable catalysts may be employed. Other catalysts include those containing cobalt, nickel, platinum, molybdenum, etc. In general, the reaction is effected at an elevated temperature of from about 95° C. to about 260° C. and a hydrogen pressure of from about 50 to about 3000 pounds per square inch.

In another embodiment the additives of the present invention are prepared by reacting the aromatic amine or aromatic diamine with cyclooctyl halide including particularly cyclooctyl chloride and cyclooctyl bromide, but also including cyclooctyl iodide and cyclooctyl fluoride. This reaction is effected by intimately stirring the reactants at a temperature within the range of from about 150° C. to 300° C. or more, preferably under sufficient pressure to maintain at least a portion of the reactants in liquid phase. This may be accomplished by introducing a substantially inert gas, such as nitrogen, into the reaction zone.

Reductive alkylation may be effected in a batch type process, but preferably is effected in a continuous process in which the reactants and hydrogen are passed at the proper temperature and pressure, in either downward or upward flow, into contact with a solid bed of the reductive alkylation catalyst disposed in a reaction zone. The reactor effluent is cooled, excess hydrogen is separated and preferably recycled for further use in the process, and the remaining effluent is fractionated or otherwise treated to separate and recover the desired N-cyclooctylamine or N,N'-dicyclooctyldiamine product. Unreacted amine or diamine likewise may be recycled to the reactor for further conversion therein.

The reaction of the aromatic amine or diamine with cyclooctyl halide may be effected in a continuous process or in a batch type process in which the reactants are heated and intimately stirred in a reaction vessel for a time sufficient to complete the reaction. The reactor effluent subsequently is treated to separate and recover the desired reaction product. The workup of the products may include neutralization with an alkaline reagent in order to remove the hydrogen halide or other halide salts which may be formed during the reaction and subsequent fractionation. If necessary, water washing, extraction with ether or other solvent also may be used to facilitate separation of the desired product. Unreacted components may be returned for further reaction into the desired product.

When desired, preparation of the additive of the present invention may be effected in the presence of a solvent. Any suitable solvent may be employed including, for example, aromatic hydrocarbons such as benzene, toluene, xylene, ethylbenzene, cumene, etc., mixtures of hydrocarbons including gasoline, naphtha, kerosene, etc.

As hereinbefore set forth, the novel additive of the present invention is used as an additive to retard and/or prevent deterioration of organic substances. The additive is used in a small but sufficient concentration to obtain the desired stabilization, which concentration generally is within the range of from about 0.0001% to about 5% by weight, depending upon the specific organic substance being stabilized. For example, when used in rubber, the additive generally is utilized in a concentration of from about 1% to about 5% by weight of the rubber hydrocarbon. When used in gasoline or other hydrocarbon distillates or fatty materials, the additive is used in a concentration of from about 0.0001% to about 1% by weight thereof. When desired, the additive of the present invention may be prepared as a physical mixture with one or more other additives to be incorporated in the specific organic substrate being stabilized.

It is understood that the additive may be incorporated in the organic substance in any suitable manner. For example, when incorporated in a liquid organic substance, the additive is added to the liquid and then preferably is suitably agitated to obtain uniform distribution therein. When the additive is incorporated in a compounded substrate, the additive may be mixed with one or more of the ingredients and then processed therewith into the final composition or the additive may be incorporated as a separate step in the compounded material. For example, when the additive is to be incorporated in rubber, it may be added either alone or with one or more of other ingredients and compounded in this manner into the mix prior to vulcanization thereof. In another embodiment the additive may be applied in the form of dust or spray onto vulcanized rubber products. As another example, when the additive is to be incorporated into grease, it may be mixed with one or more of the ingredients prior to final compositing into the grease product.

It is to be understood that the additive of the present invention may be used along with other additives incorporated in the organic substances. For example, when used in rubber, the additive of the present invention may be used along with other antioxidants such as phenyl-beta-naphthylamine, 6-phenyl-2,2,4-trimethyl-1,2-dihydroquinoline, marketed under the trade name of "Santoflex B," 2,2' - methylene-bis-(4-methyl-6-t-butylphenol), 2,6-di-t-butyl-p-cresol, the reaction product of acetone and diphenylamine, marketed under the trade name of "B.L.E.," etc. These antioxidants generally are used in a concentration from about 0.5% to about 3% by weight of the rubber. Also, the additive may be used along with paraffin and/or microcrystalline wax, these generally being used in a concentration of 0.5% to about 3% by weight of rubber.

It is understood that the rubber which is stabilized in accordance with the present invention includes rubber used for automobile tires and tubes, hose, belting, sheet and thread rubber, rubberized fabrics, molded goods, boots and shoes, etc., whether vulcanized in a mold, in open steam, in hot air, or in the cold by the so-called acid process.

The following examples are introduced to illustrate further the novelty and utility of the present invention but not with the intention of unduly limiting the same.

Example I

N,N'-dicyclooctyl-p-phenylenediamine was prepared as follows. A mixture of 30 g. of cyclooctanone, 10.5 g. of p-phenylenediamine and 50 g. of benzene was heated with 5 g. of a catalyst comprising 0.4% by weight of platinum composited with alumina at 160° C. under 100 atmospheres hydrogen initial pressure for 4.5 hours. Hydrogen absorption occurred, the final pressure being 89 atmospheres at room temperature. The reactor effluent was filtered and the filtrate was distilled under reduced pressure. There was recovered 20 g. (40% of theoretical) of N,N'-dicyclooctyl-p-phenylenediamine. This product boiled at 200–210° C. at 0.6 mm. pressure and had a melting point of 53–54° C.

Example II

N,N'-dicyclooctyl-p-phenylenediamine, prepared as described in Example I, was used as an antiozonant in SBR rubber. Three parts by weight were incorporated in a rubber formulation of the following recipe.

| Ingredient: | Parts by weight |
|---|---|
| SBR 1502 | 100 |
| Carbon black | 40 |
| Circosol 2XH [1] | 10 |
| Zinc oxide | 3 |
| Stearic acid | 2 |
| Sulfur | 2 |
| Santocure [2] | 1.25 |

[1] Oil.
[2] N-cyclohexyl-2-benzothiazolesulfenamide.

For comparative purposes, a batch of the same recipe was prepared without additive to be used for a blank or control sample. Each batch of the rubber was cured for 40 minutes at 140° C. and then the rubber samples were cut into test strips of 1″ x 1″. The test strips were elongated 10% in one series and 20% in another series and then mounted on varnished wooden panels. The panels were placed in an ozone cabinet and subjected to an atmosphere containing about 40 parts of ozone per 100 million parts of air at 38° C.

Both control samples (containing no additive) cracked visibly in less than 2 hours. In contrast, both samples containing N,N'-dicyclooctyl-p-phenylenediamine showed no visible signs of cracking after 168 hours exposure.

Example III

N-cyclooctylaniline was prepared by reacting aniline with cyclooctyl chloride as follows. A mixture of 76 g. (0.82 mole) of aniline and 45 g. (0.31 mole) of cyclooctyl chloride was placed in a Pyrex glass tube (closed at one end) and then the glass tube was placed in a rotating autoclave and heated to 200° C. for 5.5 hours. To prevent the reactants from passing out of the glass tube into the autoclave, the autoclave was pressured with 30 atmospheres of nitrogen. Following completion of the reaction, the products were separated by addition of water, neutralization, extraction with ether and fractionation at reduced pressure. There was recovered 19 g. of N-cyclooctylaniline. This amounted to a 30% yield of the theoretical. The purified N-cyclooctylaniline is a relatively clear liquid having a boiling point of 141–144° C. at 1.7 mm. pressure and has an index refraction, $n_D^{20}$, of 1.5652.

Example IV

N,N'-dicyclooctyl-p-phenylenediamine is used as an inhibitor in gasoline comprising a blend of catalytically reformed and catalytically cracked gasolines. The gasoline without inhibitor has an Induction Period of 240 minutes. Upon the addition of 0.003% by weight of N,N'-dicyclooctyl-p-phenylenediamine to another sample of the gasoline, the Induction Period of the gasoline is increased to 495 minutes.

Example V

N-cyclooctyl-2,6-dimethyl-4-t-butylaniline is prepared by the reductive alkylation of 2,6-dimethyl-4-t-butylaniline with cyclooctanone, substantially in the manner described in Example I. N-cyclooctyl-2,6-dimethyl-4-t-butylaniline is used in a concentration of 0.002% by weight in cracked gasoline and serves to more than double the Induction Period of the gasoline.

Example VI 4,4'-bis(cyclooctylamino)diphenylmethane is used as an antioxidant in synthetic lubricating oil. The synthetic lubricating oil is dioctyl sebacate and the antioxidant is incorporated therein in a concentration of 1% by weight.

The dioctyl sebacate then is used as a lubricant in high temperature service. This additive serves to prevent oxidative deterioration of the lubricant during such use. The activity of the lubricant is determined by analyses of the used oil. These analyses include determination of the Induction Period (hours to 5 lbs. pressure drop) according to ASTM method D942, and also the percent insoluble in isooctane and the percent change in viscosity of the used oil compared to the fresh oil.

Example VII 2,4'-bis(cyclooctylamino)diphenyl ether is used as an additive in lithium base grease. The grease is prepared by mixing 91% of a Pennsylvania bright stock with 8% of lithium stearate. The mixture is heated at about 232° C. with agitation. Subsequently the grease is cooled to 160° C. while agitating and, at this temperature, 1% by weight of 2,4'-bis(cyclooctylamino)diphenyl ether is added. Agitation is continued and the mixture then is cooled to about 121° C. and the grease then further cooled slowly to room temperature.

The stability of the grease is tested according to a modified Norma Hoffman method in which a sample of the grease is placed in a bomb in the presence of brass discs acting as an oxidation catalyst, and oxygen is charged thereto. The bomb then is heated to 100° C. and the time required for a drop of five pounds pressure is taken as the Induction Period. When so evaluated, a control sample of the grease (not containing this additive) has an Induction Period of 10.5 hours. On the other hand, the Induction Period of the sample of grease containing 1% by weight of 2,5'-bis(cyclooctylamino)diphenyl ether is increased more than four fold.

Example VIII

N-cyclooctyl-2,6-di-t-butyl-4-methylaniline is used as an antioxidant in lard. The lard used in this example has a normal stability period of 2 hours as determined by the "Swift" test. This test is described in detail in an article by A. E. King, H. L. Roschen and W. H. Irwin, which appeared in Oil and Soap, pages 105–109, June 1933, and modified as described in the article by R. W. Reimenschneider, J. Turer and R. M. Spec, which appeared in Oil and Soap, pages 169–171, September 1943. In general, this test comprises bubbling air through a sample of the lard and determining rancidity organoleptically and by peroxide values. There is incorporated 0.02% by weight of N-cyclooctyl-2,6-di-t-butyl-4-methylaniline in another sample of the lard which serves to increase the stability period thereof to over 100 hours.

I claim as my invention:

1. A compound of the formula

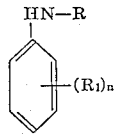

wherein R is cyclooctyl, $R_1$ is alkyl having from 1 to about 6 carbon atoms, and $n$ is an integer of 2 or 3.

2. The compound of claim 1 wherein at least one $R_1$ is t-alkyl having from 4 to about 6 carbon atoms.
3. N-cyclooctyl-2,6-di-lower alkyl-4-t-lower alkyl-aniline.
4. N-cyclooctyl-2,6-dimethyl-4-t-butylaniline.
5. N-cyclooctyl-C, C'-di-lower alkyl-aniline.
6. N-cyclooctyl-C, C', C''-tri-lower alkyl-aniline.
7. N-cyclooctyl-2,4,6-tri-lower alkyl-aniline.

References Cited

UNITED STATES PATENTS

| | | | |
|---|---|---|---|
| 2,645,674 | 7/1953 | Kinney. | |
| 2,905,655 | 9/1959 | Albert | 260—576 XR |
| 3,081,349 | 3/1963 | Spacht | 260—576 |
| 3,057,819 | 10/1962 | Kibler | 260—45.9 |
| 3,079,366 | 2/1966 | Boyle et al. | 260—45.9 |
| 2,904,416 | 9/1959 | Clarke et al. | 44—72 |
| 2,912,314 | 11/1959 | Geller et al. | 44—72 |
| 2,288,392 | 6/1942 | Davis | 260—576 |
| 2,573,608 | 10/1951 | Rieverschl et al. | 260—576 |

FOREIGN PATENTS 15,968   10/1960   Japan.

OTHER REFERENCES

Loevenich et al.: "Chemical Abstracts," vol. 24, pp. 1849–50 (1930).

Richter: "The Chemistry of the Carbon Compounds," vol. II, p. 1 (1939).

Brieglab et al.: "Chemical Abstracts," vol. 53, p. 6753 (1959).

CHARLES B. PARKER, *Primary Examiner.*

R. V. HINES, *Assistant Examiner.*